US006530164B2

United States Patent
Gai

(10) Patent No.: US 6,530,164 B2
(45) Date of Patent: Mar. 11, 2003

(54) LUMINOUS DIFFUSED LIGHT PANEL WITH LOW ENERGY CONSUMPTION AND LIMITED THICKNESS

(76) Inventor: Giorgio Gai, Via Donato Somma n. 78, I-16121 Genoa (IT)

( * ) Notice: Subject to any disclaimer, the term of this patent is extended or adjusted under 35 U.S.C. 154(b) by 25 days.

(21) Appl. No.: 09/849,726

(22) Filed: May 4, 2001

(65) Prior Publication Data

US 2002/0007576 A1 Jan. 24, 2002

(30) Foreign Application Priority Data

May 12, 2000 (IT) .................................. GE2000A000066
Apr. 13, 2001 (IT) .................................. GE2001A000035

(51) Int. Cl.[7] .............................................. G09F 13/18
(52) U.S. Cl. ........................................................ 40/546
(58) Field of Search .......................... 40/544, 546, 577

(56) References Cited

U.S. PATENT DOCUMENTS 4,138,620 A * 2/1979 Dickson ........................ 313/1
5,842,297 A * 12/1998 Tung ........................... 362/812
6,076,294 A * 6/2000 Durbin ......................... 40/544
6,305,109 B1 * 10/2001 Lee ............................. 40/546

FOREIGN PATENT DOCUMENTS

| DE | 29700485 | 4/1998 |
| EP | 0893708 | 7/1999 |
| WO | WO9951914 | 10/1999 |

* cited by examiner

Primary Examiner—Russell D. Stormer
Assistant Examiner—Robert J. McCarry, Jr.
(74) Attorney, Agent, or Firm—Richard M. Goldberg

(57) ABSTRACT

A luminous diffused light panel of limited thickness and low consumption includes a transparent plate, an LED assembly resting on a support for sequential energization and being mounted against an edge of the transparent plate, a reflecting element between the support and a polished edge of the transparent plate to reflect emitted light from the LED assembly towards the polished edge of the transparent plate, a coating on a rear surface of the transparent plate for reflecting and diffusing LED emitted light outwards through an opposite surface, an opaline plate positioned a short distance from the transparent plate for diffusion of light emitted from the opposite surface of the transparent plate, a protective transparent plate positioned in front of the opaline plate, framing sections fitted on sides of the plates to cover the LEDs, and indicia provided between the opaline plate and the protective transparent plate.

17 Claims, 5 Drawing Sheets

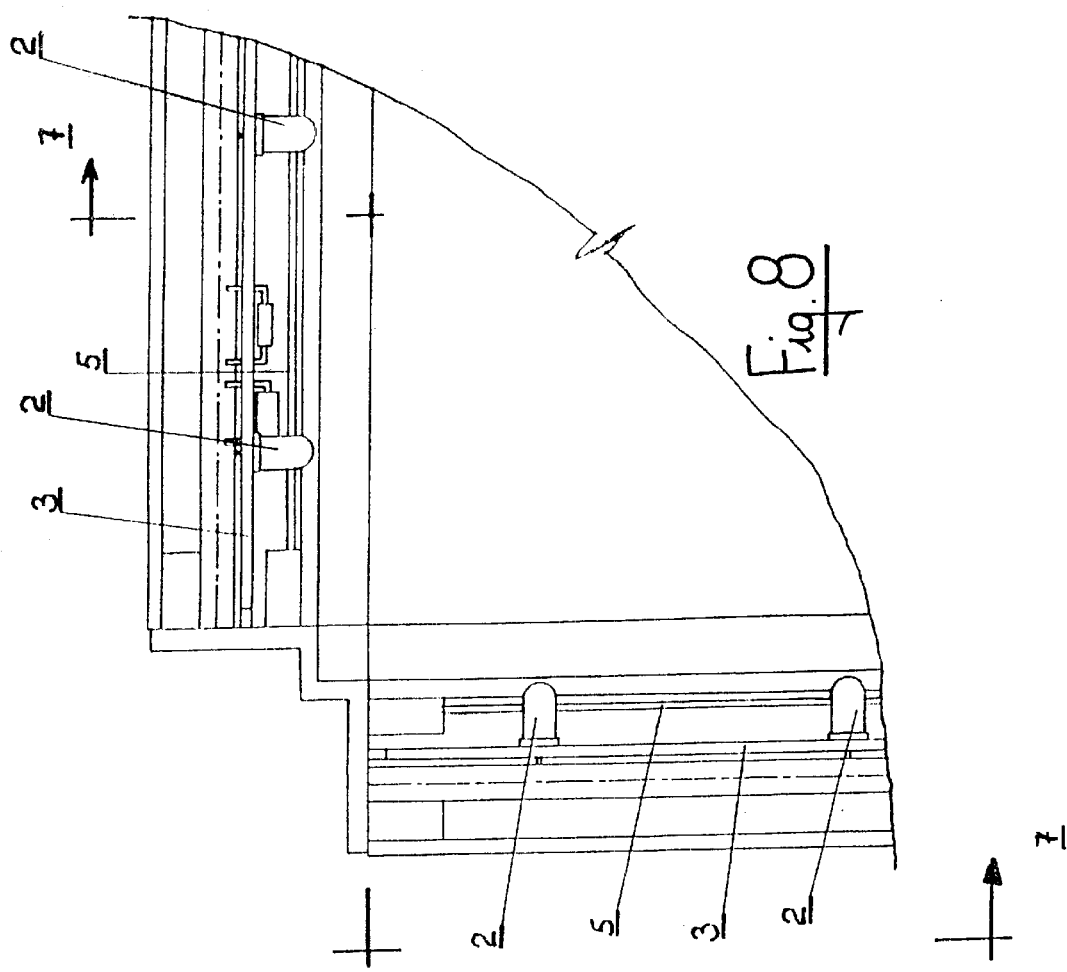
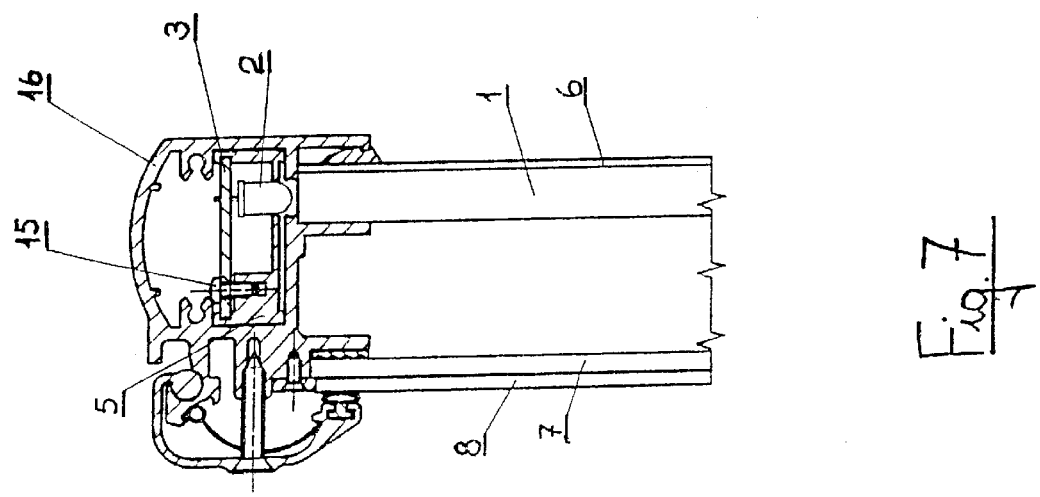

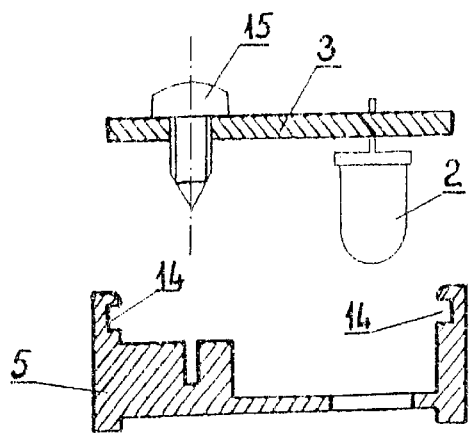
Fig. 9
Fig. 10
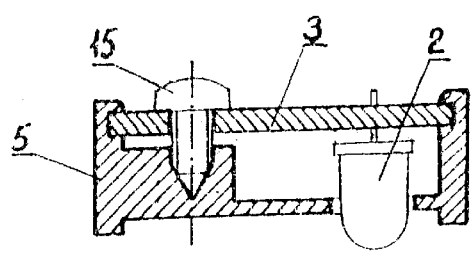
Fig. 11
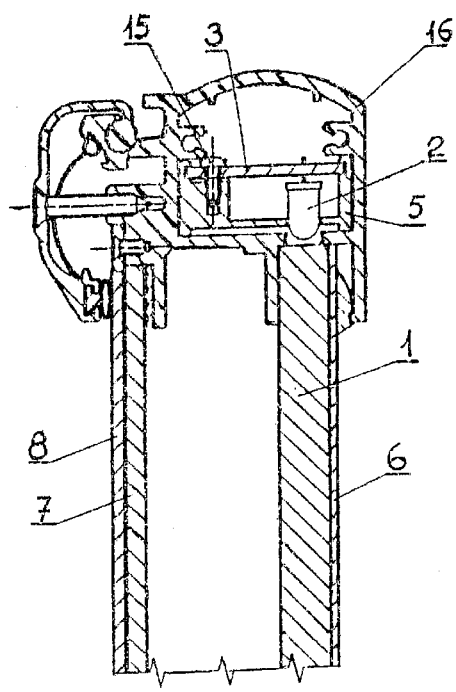
Fig. 12
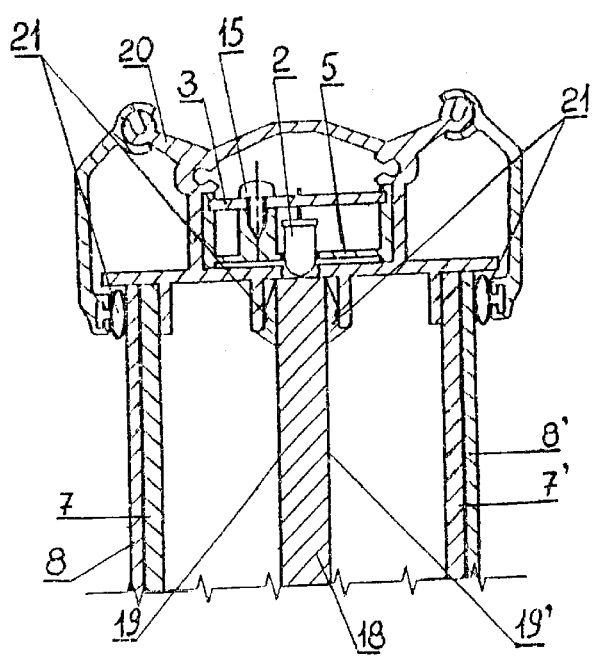
Fig. 13

LUMINOUS DIFFUSED LIGHT PANEL WITH LOW ENERGY CONSUMPTION AND LIMITED THICKNESS

BACKGROUND OF THE INVENTION

Lighting systems for luminous advertising panels, way signs, traffic marks, furnishing elements etc. are widely spread in connection with visual communication development which shall be effective even during evening and night hours and in zones not exposed to day light.

There are plentiful examples of these lighting systems.

Some known systems are located on the outsides of the signs to be illuminated so that the signs or indications are visible by reflected light.

For example, internally lighted signs are also known, usually formed by neon lamps mounted inside a container provided with an opaline plate bearing on its surface the indications or signs which are usually in transparent and coloured material.

These internally or externally illumination of marks and signs achieved with normal neon lamps shall , however, be directly powered from the mains because of their high consumption rate.

To remedy this drawback of the lighting system, it is sometimes possible to replace the neon lamps of internal lighting systems by LEDs (light emitting diodes). These LEDs are fitted inside the container where they are forming the required signs or words with the utilization of rays of light emitted b the LEDs positioned side by side so as to form the word or image.

These led's have a high brilliancy, low electric energy consumption and a long average life of about one hundred thousand hours. Panels are known that are completely covered by led's which are energized in different modes so as to form different images or words. In these applications, the opaline plate may be replaced by a transparent plate.

This led application system offers a considerable economic advantage, especially regarding consumption with the possibility for the human eye to read at a distance of about 150 m.

This led lighting system has, in turn, the serious drawback in that it requires a great number of led's, emitting—as is known—a rather concentrated light; furthermore the already known led systems permit to form a specific image and to change this image it will be necessary to change the arrangement of the led's inside the container or will require at least a great number of led's to be energized in different ways.

SUMMARY OF THE INVENTION

This invention has the aim to obtain a luminous diffused light panel characterized by low energy consumption and limited thickness, requiring only a limited number of led's.

According to this invention, the luminous panel consists of a plate assembly and accessories implemented as follows.

The first plate consists of transparent material, for instance metacrylate, polycarbonate, glass, crystal or any other light conducting material, provided along one, two or more of its edges with a linear led assembly mounted on a suitable support and sequence energized.

This support may be a printed circuit and a reflecting element, further securing the perfect positioning of the led's, is inserted between the support and the polished edge of the plate.

The back side of this first transparent plate is prepared to reflect and diffuse the led emitted light by covering this surface with a white paint coat or with a glued or adhesive film of suitable thickness and material. This first plate is usually flat but it may also be curved. In this way, the light of the led's propagates through the light conducting plate and reflects on the paint or film, coating its back surface, thus diffusing the light outwards.

A second opaline plate, placed at a few millimeters from the first transparent plate, will further diffuse the light from its surface at an extraordinary high emission uniformity. The latter plate may be replaced by two plates having a lower opacity grade but which will be positioned nearer to the first plate so as further to reduce the thichness of the luminous panel.

A third protective plate in transparent material will be placed in front of the second plate at a few millimeter distance or will be resting on the second plate, while another protective plate, which needs not be transparent, may be placed behind the first plate.

The luminous panel thus described will diffuse the light only from the second opaline plate surface. The case is also considered in which a luminous panel diffuses the light from both sides. In such case, the white paint or film is applied in alternating and staggered strips or with other schemes on both surfaces of the first light conducting plate thus causing the light to be reflected and diffused from both sides of the first plate. The luminous panel is then equipped with two (or four) opaline plates, one on each side and also with two transparent protective plates one on each side. The plate and led assembly together with their supports are mounted in a structure of aluminium sections or in other plastic material fitted on the four sides of the plates, which will thus form a peripheral frame, the corners of which are finished with corner caps screwed onto the sections. If required, proper electronic components will be provided for grounding and protection of the luminous panel against overvoltage and electrostatic discharge.

The peculiar arrangement of the led's, the special plate sequence and the particular aluminium or plastic sections will permit to reduce the panel thickness to about 50 mm against the 130 mm thickness of known panels internally lighted by neon lamps.

Such luminous diffused light panels of limited thickness and low consumption rate, preferably equipped with two series of lateral led's, will be able, for instance, to illuminate an advertising sign at low energy consumption. It is also suitable to illuminate identification panels of any kind, such as traffic signs, radiograph reading devices as well as luminous panels for furnishings, consoles and luminous surfaces.

The notices or indications to be highlighted may be printed or serigraphed on the outer surface of the opaline plate or on the internal surface of the transparent protection plate or on a translucid film inserted between the two above mentioned plates.

As by a first solution as explained, the supporting and the reflecting clement of the Led's are mutually independent and are kept in place by properly shaped framing sections.

This arrangement is practical for panels of limited size, while for large sized panels, the alignment of the supporting sections, the reflecting elements and therefore of the Led's may sometimes be difficult.

This drawback is eliminated, according to this new invention, by manufacturing the supporting structure, consisting of the printed circuit, and the reflecting element so that they can be assembled before they are fitted into the section frame which is modified in order to permanently lodge the above mentioned supporting structure and the reflecting element.

According to the above description the first transparent plate surrounded by the leds has one surface covered with a white paint coat or with a glued or adhesive film diffusing the light which propagates through the other, non-coated surface of the plate.

In some cases, especially for large sized panels, the light intensity at the centre of the panels i.e. further away from the peripheral led's, may be lower due to the fact that the light is mainly diffused in the peripheral zones and is attenuated in the central zones. In these cases light diffusion can be much improved, according this invention, if the surface of the first transparent plate generating diffused light on one side only is treated, instead of being uniformly coated with paint or a film, so as to create a geometrical pattern on this surface determined by alternating areas reflecting the light to the opposite panel surface and non-treated areas allowing the light to propagate through the plate. The light intensity in the centre of the plate will thus be improved and light diffusion through the whole plate surface will become more uniform.

The reflecting surface areas may be obtained by the application of materials such as paints, serigraphy inks, transparent or opaque adhesive films or even by chemical etching using solutions reacting with the plate surface, or by chipping or roughing processes or sand blasting or in the case of plates in plastic material, by thermal deformation.

For exemplification purposes, ink deposited by serigraphy on suitably spaced parallel strips of a few millimeter width will yield excellent results.

However the pattern may be widely varying: it may be linear (lengthwise, transverse or diagonally with respect to the light emitted by the led's), chequered, spiral formed or differently dimensioned so as to create a nuanced light diffusion.

An additional advantage of this method regarding treated and non-treated areas is that the second opaline plate, used to obtain a better light diffusion, may be placed nearer to the light emitting side of the first transparent plate which is surrounded by led's, without generating halations or less luminous areas. This is an obvious improvement with respect to the above mentioned solution.

As for lighting panels in which the light is diffused from both sides, the process selected from those indicated above has to be alternatively performed on both sides of the first transparent plate, obviously in alternate pattern: for example, the serigraphed stripes on one side shall be matched by a non treated area and shall therefore be transparent on the other side.

The invention in question is illustrated in its exemplar solutions in the closed drawings in which:

BRIEF DESCRIPTION OF THE DRAWINGS

FIG. 7 shows a side and partial section view taken along line 7—7 of FIG. 8 of a varied panel subject matter of this invention, in the solution by which the light is diffused on one side only.

FIG. 8 shows a partial front view of the panel.

FIG. 9 shows a cross section of a printed circuit supporting the Led's.

FIG. 10 shows a cross section of an exemplified element reflecting the Led emitted light.

FIG. 11 shows the assembly of the support of FIG. 9 and the reflecting element of FIG. 10.

FIG. 12 shows the section of the exemplified panel where it matches the framing section of the first transparent plate through which the light is diffused on one side only.

FIG. 13 shows the section of an exemplified panel where it matches the framing section of the first transparent panel through which the light is diffused on both sides.

DETAILED DESCRIPTION

Figure 1:
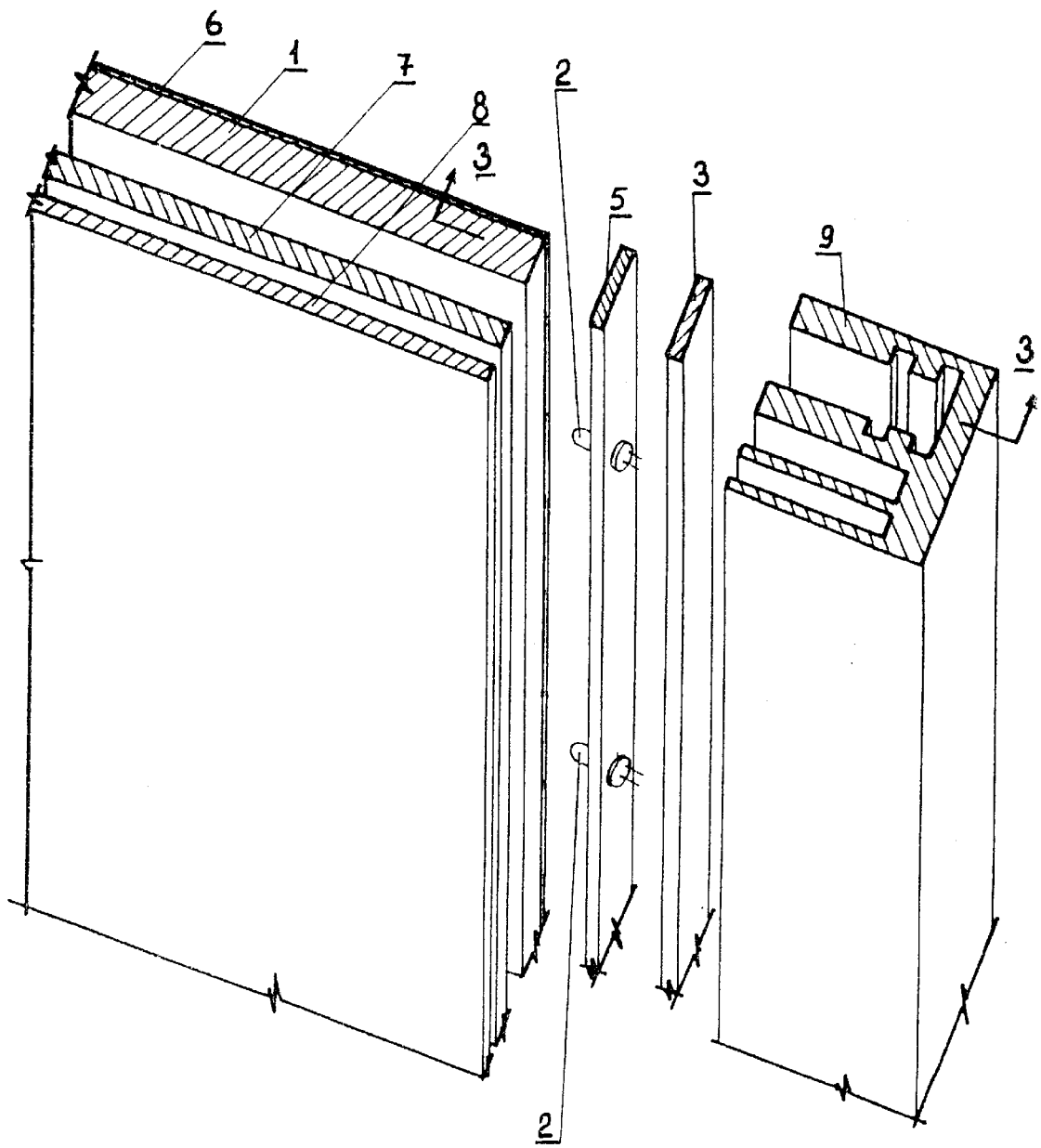
FIG. 1 shows an exploded partial view of the luminous panel, featuring one of its sides equipped with led's.
Figure 2:
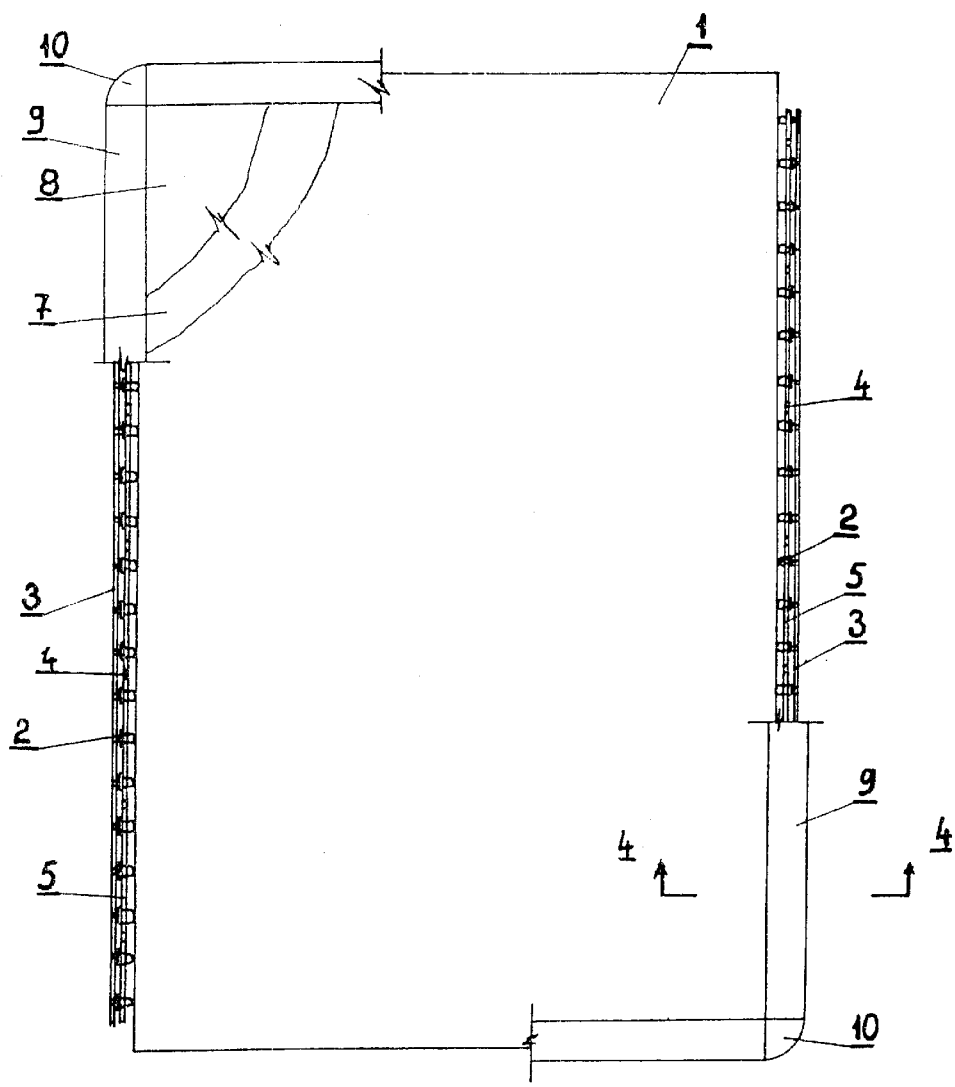
FIG. 2 shows a frontal view and partial section of the luminous panel assembly.
Figure 3:
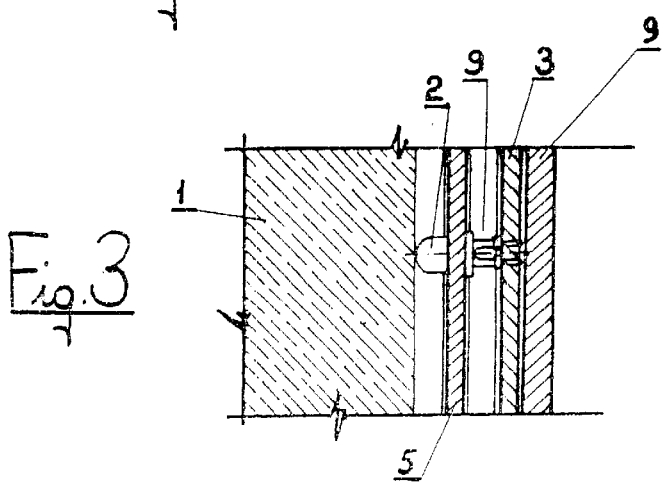
FIG. 3 shows a partial frontal section of the panel assembly taken along line 3—3 of FIG. 1.

With reference to the above figures, the luminous panel according to this invention, consists of a plate assembly complete with its accessories set up as follows.

It consists of a first plate 1 in transparent material of suitable thickness, such as for instance metacrylate, polycarbonate, glass, crystal or any other appropriate light conducting material, this first plate 1 being equipped for instance on at least two sides with a linear led assembly 2, mounted on a proper support 3 and conveniently sequence energized. This support 3 may be a printed circuit fitted with power balancing resistors 4 while one or more reflecting elements 5 are inserted between the printed circuit 3 and the polished edge of the first plate 1 so that these elements 5 reflect the light towards the edge of the plate 1 and will also further secure the perfect positioning of the led's.

The back surface of the first plate 1 has been prepared to reflect and diffuse the light emitted by the LEDs by means of a white paint coat 6 or by the application of a glued or self-adhesive film of suitable material and thickness.

This first plate 1 has usually a flat configuration but it may also be curved.

In this way, the LED emitted light propagates inside the light conducting plate, reflecting on the paint coat or film applied on its rear surface and will spread out.

A second opaline plate 7, placed at a few millimeters distance from the first transparent plate 1, will further diffuse the light from the plate surface, at an extraordinary uniform emission rate. This plate may also be replaced by two plates with lower opacity but positioned nearer to the first plate so as further to reduce the luminous panel thickness.

A third protective plate 8 in transparent material is placed in front of the second plate 7 at a few millimeter distance, while another protective plate, which needs not be transparent, may be placed behind the first plate.

The luminous panel described and illustrated in the FIGS. 1 thru 4 diffuses the light only from the side of the second opaline plate 7 and of the third protective plate 8.

Figure 5:
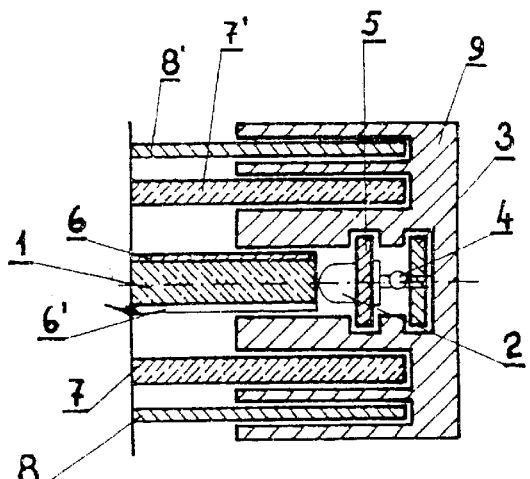
FIG. 5 shows a partial section of the panel taken along line 4—4 of FIG. 2 in a solution where the light is diffused on both sides of the panel.

The case of a luminous panel is also considered, where the light is diffused from both sides as illustrated in FIG. 5. In such case, the white paint coat 6,6' or film is applied in alternating and staggered strips or with another configuration, on both sides of the light conducting plate 1, thus causing the light to be reflected and diffused on both sides of this first plate. The luminous panel is then equipped with two (or four) opaline plates 7, 7' one (or two) on each side and also with two protective transparent plates 8,8', one on each side.

The four sides of the panel assembly, complete with led's and supports are mounted in suitably shaped sections 9 in aluminium or in plastic material thus forming a peripheral frame, the corners of which are fitted with angle caps 10 screwed or otherwise secured to the sections 9.

If necessary, proper electronic components and earthing connections will be provided to protect the luminous panel against overvoltage and electrostatic discharge.

As already explained, the peculiar positioning of the led's, the particular plate sequence and special aluminium or plastic sections will permit to obtain luminous panels of greatly reduced thickness as compared with known panels.

Obviously, for exemplification purposes as indicated in the drawings, two led series 2 are positioned on opposite sides of the first plate 1, but it is also possible to place only one led series on one side, or additional led series on one or both of the other two opposite sides.

Thus, the led emitted light penetrates through the first transparent plate from one, two or more sides, spreading in the assembly, while being reflected and diffused towards the outer surface by means of the opaque white paint coat or of a suitable film, thus reaching the opaline plate 7 which will diffuse the light in uniform brightness. The notices or indications to be highlighted may be printed or serigraphed on the outer surface of the second opaline plate 7 or on the internal surface of the third transparent protection plate 8 or on a translucid film inserted between the two above mentioned plates.

Obviously, chromatic variations are also possible, such as for instance coloured and transparent texts on opaque background or vice versa.

The printed circuits, plates and reflecting elements are mounted, as described before, in properly shaped aluminium or plastic sections 9 fitted on the four sides of the plates and connected by corner caps 10 or screwed or otherwise secured to the sections 9 so as to create a peripheral frame and to obtain a sturdy and rigid panel structure. The panel can then be pole, flag or wall mounted or otherwise installed as deemed appropriate.

Figure 6:
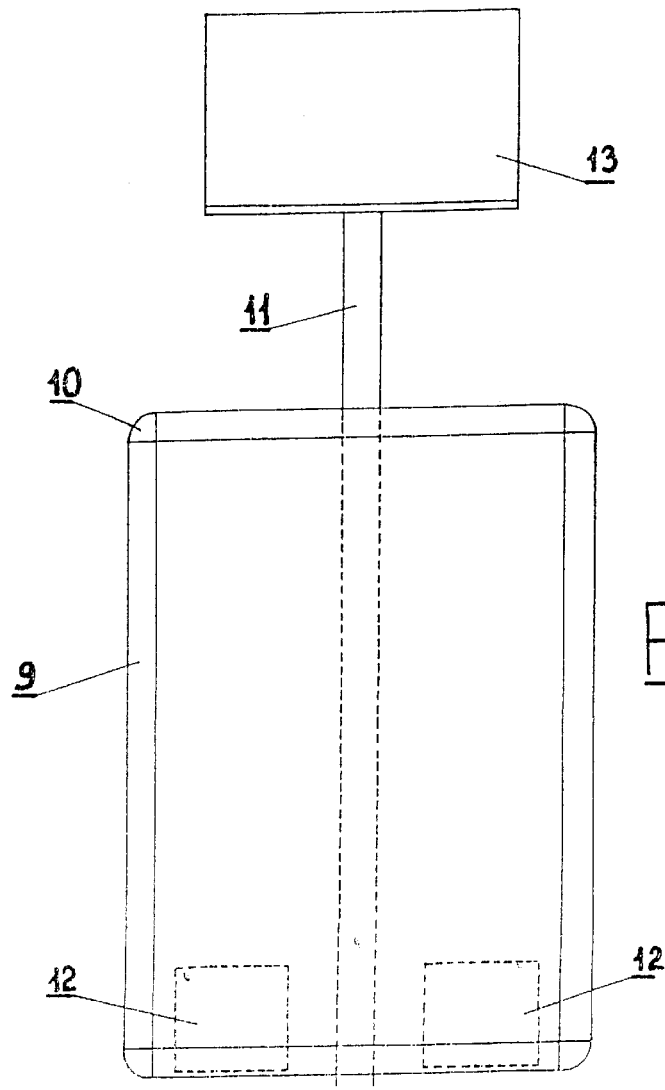
FIG. 6 shows an exemplified solution of a pole mounted sign equipped with a photovoltaic cell module and accumulators.

FIG. 6 shows an example of a pole mounted warning panel 11, completed by batteries 12 powered by a photovoltaic cell generator 13. However, whenever possible, the led's 2 may also be powered by the mains.

Figure 4:
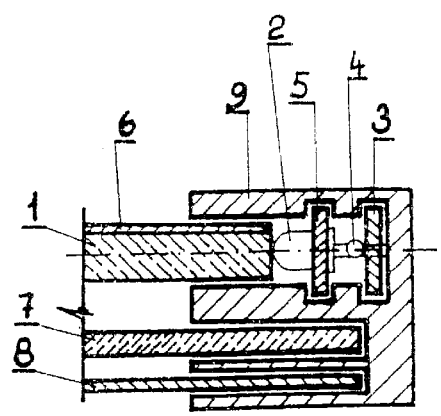
FIG. 4 shows a partial section of the panel taken along line 4—4 of FIG. 2, the light being diffused on one side only of the panel.

According to this invention, the solution as by FIGS. 4,5 is modified by assembling the support 3 of the Led's 2 and the reflecting element 5 before their installation with restrained joints 14 and eventual set screws 15 or other locking device. The two assembled elements illustrated in FIG. 11 are fitted in a suitable framing section 16 as illustrated in FIG. 12.

As said before, a sequence of Led's, supports and reflecting elements perfectly aligned along the edges of the first plate is thus obtained and this is particularly advantageous for large sized panels.

According to this invention as illustrated in the FIGS. 7 though 12, the uniform light diffusion through one surface of the first plate 18 is improved by replacing the white paint and self-adhesive film by processing operation so as to create a geometrical pattern on the light diffusing surface, this pattern being determined by alternating areas reflecting the light towards the opposite side and non treated areas through which the light freely flows inside the plate. The surface portions featuring alternating light reflecting patterns can be obtained by application of materials, such as paints, serigraphy inks, transparent or opaque films or by chemical etching or chipping or sand blasting.

The alternating patterns of the reflecting surface may have any linear, helical and variable design.

Another solution for improvement according to this invention is illustrated in FIG. 13, featuring a first transparent plate 18, the outer surfaces 19, 19' of which have been provided with alternating patterns (e.g. alternating stripes).

This solution in which the first plate 18, where both surfaces 19, 19' are featuring alternating patterns, offers the significant advantage of a virtually perfect light diffusion from the first plate 18 so that the second opaline plate 7, 7' and the third protective plate 8, 8' located on both sides of the first transparent plate 18 may be approached nearer to the transparent plate 18, thus greatly reducing the size and particularly the thickness of the panel assembly.

By the solution, the section frame 20 is properly changed as illustrated in FIG. 13.

In any case, the sections of the frame 16 and 20 and the other accessory elements normally feature properly bright polished inner surfaces so as to ensure the most efficient diffusion of the LED emitted light. The external edges of the first plate 1, 18 may also be bright polished for the same purposes.

In the above FIG. 13 the panel is emitting the light from both sides, but if light emission is required from one side only, the geometrical pattern is worked on one side only while the other side of the transparent plate 18 is darkened by means of a blind wall preferably in paint coated aluminium, positioned in substitution for the second opaline plate 7 and the third protective plate 8.

The utilization of the luminous diffused light panel subject matter of this invention allows for a vast application range, so that it may have various dimensions and configurations based upon the function to be fulfilled.

The luminous diffused light panel of limited thickness and low consumption may be used to illuminate advertising signs, traffic signs, road condition signs, courses for cars, cyclists and walk ways, signs inside and outside buildings, signs for bus and taxi stops, radiograph reading devices, luminous panels for furnishings, consoles with luminous surface and many other applications to draw the attention to a surface, an object or indication by the emission of diffused light.

Obviously, according to this invention, other solutions may be envisaged by which the first transparent plate 1, 18 is properly coated with mat or glossy white paint or with a film or is processed to obtain in alternating geometrical pattern, or is featuring one or more transparent films sticking to one or both surfaces of the first transparent plate 1, 18 and on one or more second opaline plates followed by a third transparent plate 8, while keeping in mind that all these solutions can utilize the frame sections 16, 20 adjusted to the various needs by means of proper jointings 21.

What is claimed is:

1. A luminous diffused light panel of limited thickness and low consumption which may be used to illuminate advertising signs, traffic signs, road condition signs, car lanes, cyclist paths and walkways, signs inside and outside buildings, signs for bus and taxi stops, radiograph reading devices, luminous panels for furnishing, and consoles with luminous surfaces, to draw attention to a surface, an object or indication by the emission of diffused light, comprising:

a first transparent plate having a polished edge and a front surface, a support including a printed circuit provided with resistors for balancing an electric power supply, a linearly arranged LED assembly resting on said support for sequential energization, said linearly arranged LED assembly being mounted against at least one edge of the transparent plate, at least one reflecting element inserted between the printed circuit and the polished edge of the transparent plate to reflect emitted light from the LED assembly towards the polished edge of the transparent plate and to ensure a perfect positioning of LEDs of the LED assembly, a coating on a rear surface of the transparent plate for reflecting and diffusing the LED emitted light outwards through an opposite surface of the transparent plate, an opaline plate positioned directly in front of the front surface of the transparent plate so as to cover substantially the entire front surface of the transparent plate for further diffusion of light emitted from the opposite surface of the transparent plate, a protective transparent plate positioned in front of the opaline plate, framing sections fitted on sides of the first transparent plate, the opaline plate and the protective transparent plate so as to cover the LEDs, and indicia provided between the opaline plate and the protective transparent plate.

2. A luminous panel according to claim 1, wherein said first transparent plate is made from a material selected from the group consisting of metacrylate, polycarbonate, glass, crystal and light conducting materials.

3. A luminous panel according to claim 1, wherein said coating is selected from the group consisting of a white paint coat and an adhesive film applied to the rear surface of the first transparent plate.

4. A luminous panel according to claim 1, wherein said protective transparent plate rests against the opaline plate.

5. A luminous panel according to claim 1, wherein said framing sections are made from a material selected from the group consisting of aluminum and plastic.

6. A luminous panel according to claim 1, wherein each of said first transparent plate, opaline plate and protective transparent plate are provided with four sides, and said framing sections are formed on the four sides of said first transparent plate, opaline plate and protective transparent plate, and further comprising corner caps secured to corners of the framing sections.

7. A luminous panel according to claim 1, wherein said indicia provided between the opaline plate and the protective transparent plate, is provided by at least one of the following:

a) said indicia is printed on an outer surface of the opaline plate, b) said indicia is serigraphed on the outer surface of the opaline plate, c) said indicia is printed on an inner surface of the protective transparent plate, d) said indicia is serigraphed on the inner surface of the protective transparent plate, and e) said indicia is provided by a translucid film inserted between the opaline plate and the protective transparent plate.

8. A luminous panel according to claim 1, wherein said first transparent plate, opaline plate and protective transparent plate are formed with one of the following shapes:

a) flat, and b) curved.

9. A luminous panel according to claim 1, wherein said opaline plate is formed by two opaline plates positioned close to each other and close to the first transparent plate to reduce the thickness of the panel.

10. A luminous panel according to claim 1, wherein said LED assembly includes LEDs located against opposite edges of the first transparent plate.

11. A luminous panel according to claim 1, wherein:

said coating is applied in alternating, staggered strips on opposite surfaces of the first transparent plate to cause light to be reflected and diffused on said opposite surfaces of the first transparent plate, there is at least one opaline plate on each side of said first transparent plate, and there is a protective transparent plate on each side of said first transparent plate.

12. A luminous panel according to claim 1, wherein said support includes a pre-assembly of a reciprocal jointing and a blocking element to provide the LEDs in a preset sequence and a perfect alignment prior to installation with the plates.

13. A luminous panel according to claim 1, wherein said coating includes a geometrical pattern on the rear surface of the first transparent plate for reflecting light towards the opposite surface of the first transparent plate, said geometrical pattern alternating with non-reflecting areas which allow the light to propagate inside the first transparent plate.

14. A luminous panel according to claim 13, wherein:

said alternating pattern is provided on opposite surfaces of said first transparent plate to cause light to be reflected and diffused on said opposite surfaces of the first transparent plate, there is an opaline plate on each side of said first transparent plate, and there is a protective transparent plate on each side of said first transparent plate.

15. A luminous panel according to claim 1, wherein said framing sections are constructed in accordance with the number and configuration of said first transparent plate, opaline plate and protective transparent plate, the support and said at least one reflecting element.

16. A luminous panel according to claim 1, further comprising electronic and ground components for protecting the panel against overvoltage and electrostatic discharges.

17. A luminous panel according to claim 1, further comprising a photovoltaic cell generator for charging a powering device for the LEDs.

* * * * *